United States Patent [19]

Skrentner

[11] Patent Number: 4,573,840
[45] Date of Patent: Mar. 4, 1986

[54] PISTON COUNTERBORING MACHINE

[75] Inventor: Frank C. Skrentner, Fenton, Mich.

[73] Assignee: Lamb Technicon Corp., Warren, Mich.

[21] Appl. No.: 596,141

[22] Filed: Apr. 2, 1984

[51] Int. Cl.[4] ............................ B23C 3/04; B23C 3/34
[52] U.S. Cl. ...................................... 409/200; 409/171
[58] Field of Search ........................... 51/90, 119, 120; 409/171, 179, 200, 190; 279/6

[56] References Cited

FOREIGN PATENT DOCUMENTS 1112871 8/1961 Fed. Rep. of Germany ...... 409/200

Primary Examiner—Eugene F. Desmond
Attorney, Agent, or Firm—Barnes, Kisselle, Raisch, Choate, Whittemore & Hulbert

[57] ABSTRACT

A machine for forming an annular counterbore in the outer face of the solid end of a piston has a tool supporting spindle rotated on its own central axis and simultaneously revolved about an eccentric axis, the eccentricity of the axis of revolution being adjustable to accommodate pistons of different diameters.

11 Claims, 10 Drawing Figures

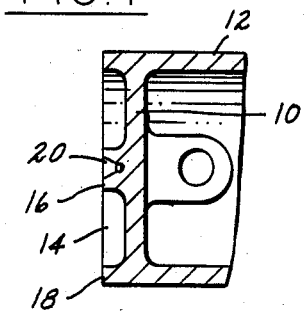
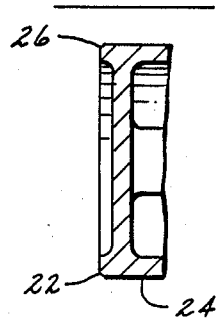
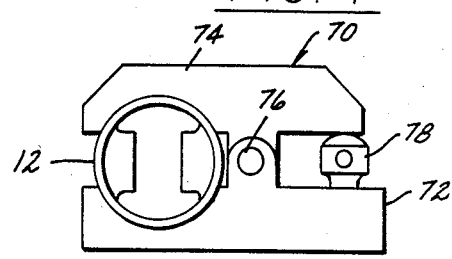
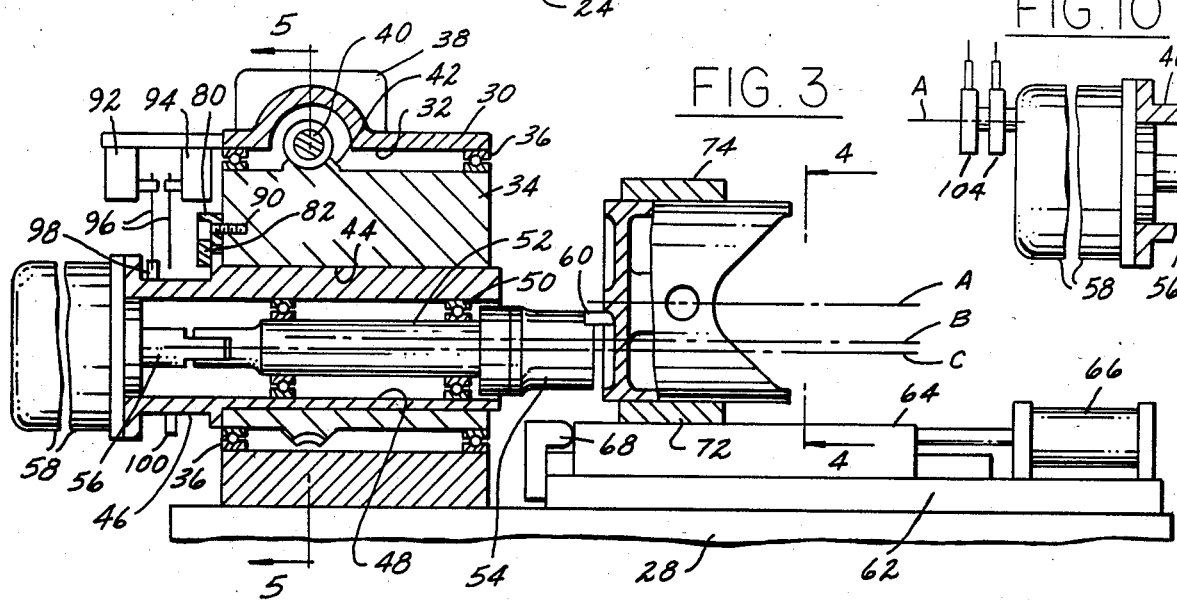
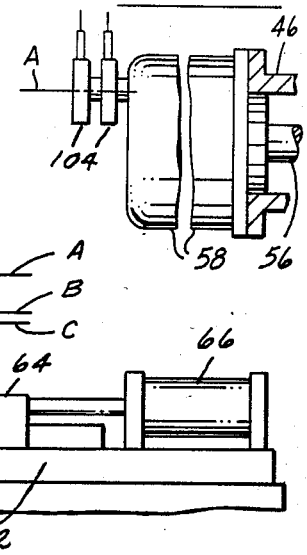
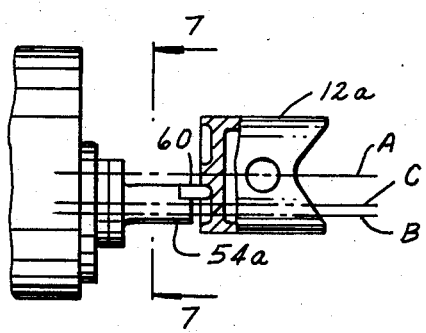
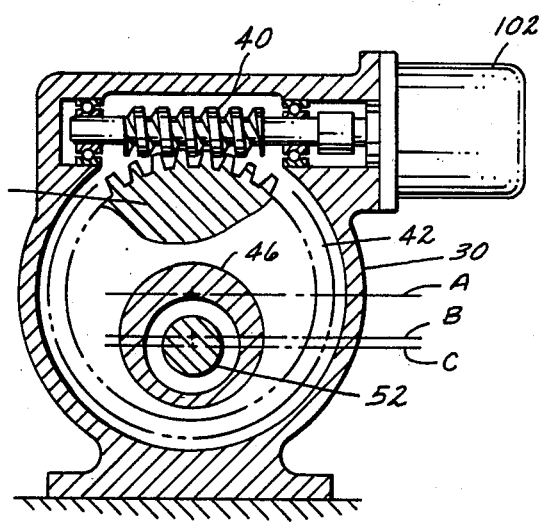
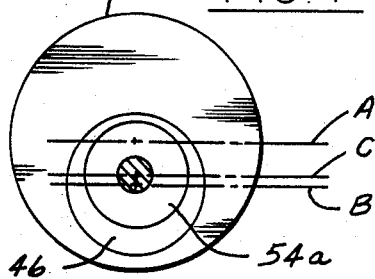
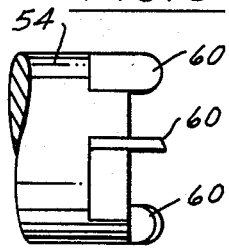
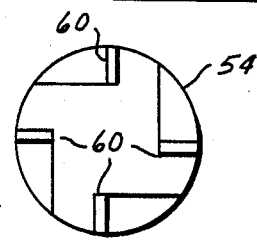

PISTON COUNTERBORING MACHINE

This invention relates to a machine for forming an annular counterbore in the solid outer end face of a piston.

When manufacturing pistons for internal combustion engines it is common practice that, after the piston is cast and while it is still in the foundry, the closed outer end face of the piston is machined with a counterbore that has an axially outwardly projecting land at the center thereof in which a centering hole is subsequently formed. This operation is normally performed at the foundry so that the large amount of metal removed by this machining operation will be readily available at the foundry for remelting. The centering hole in the land is subsequently utilized by a centering fixture on a piston turning machine so as to stabilize the piston while the cylindrical portion of the piston is being machined. When the piston is completely machined, the central land with the tapered centering hole is removed, thereby leaving a true counterbore in the closed end of the piston which functions as a portion of the combustion chamber when the piston is installed in an engine.

The object of the present invention is to provide a machine capable of generating the annular counterbore in the solid outer end face of the piston and simultaneously capable of being adjusted to machine a variety of different sized counterbores in different sizes of pistons.

Other objects, features and advantages of the present invention will become apparent from the following description and accompanying drawings, in which:

FIG. 1 is a fragmentary sectional view of a piston after it has been machined according to the present invention;

FIG. 2 is a fragmentary sectional view of the piston after it has been completely finish machined;

FIG. 3 is an elevational view of a machine according to the present invention with portions shown in section;

FIG. 4 is a view taken along the line 4—4 in FIG. 3 and showing a clamp for securing the piston on the machine;

FIG. 5 is a sectional view taken along the line 5—5 in FIG. 3 and showing the machine adjusted to machine the largest diameter piston;

FIG. 6 is a fragmentary side elevational view, partly in section, showing the machine adjusted to machine the smallest size piston;

FIG. 7 is a view taken along the line 7—7 in FIG. 6;

FIG. 8 is a fragmentary side view of the cutting tool used on the machine;

FIG. 9 is an end view of the cutting tool illustrated in FIG. 8; and

FIG. 10 is a schematic fragmentary side view showing an electric spindle drive motor and slip rings supplying power to the motor.

The machine according to the present invention is designed to form in the solid end face 10 of a piston 12 an annular counterbore 14 which extends around a central outwardly extending land 16 and which provides the end of the piston with an annular peripheral flange 18. Subsequent to the machining operation described herein, a tapered centering hole 20 is formed in the central land 16 which will be used for various purposes during the subsequent machining operation of the piston. The final configuration of the end face of the piston after finish machining is illustrated in FIG. 2. The end face 22 of the annular flange 18 is machined to size and the central land 16 is removed. Likewise, the cylindrical outer surface 24 of the piston is machined to the desired size and a chamfer 26 is formed around the outer periphery of flange 18.

The machine of the present invention is illustrated in FIG. 3 and includes a base 28 on which a headstock housing 30 is fixedly mounted. Housing 30 is formed with a bore 32. A cylindrical carrier 34 is journalled within bore 32 by means of bearings 36. Carrier 34 is adapted to be rotated within housing 30 by means of a motor 38 through a worm 40 and a worm gear 42. The axis around which carrier 34 rotates is designated A.

Carrier 34 is formed with an axial bore 44 which is eccentric relative to the axis A. The central axis of bore 44 is designated B. Within bore 44 there is arranged a tubular spindle housing 46. Housing 46 is formed with a bore 48 having a central axis C which is eccentric relative to the axis B of the bore in spindle housing 46.

Within the bore 48 there is journalled, as by bearings 50, a spindle 52. A tool holder 54 is mounted on one end of spindle 52. The opposite end of spindle 52 is operatively connected with the output shaft 56 of a motor 58 supported at the adjacent end of spindle housing 46. In FIG. 3 a single cutting tool 60 is shown supported on the tool holder 54.

A slideway 62 is mounted on base 28 and a slide 64 is arranged on slideway 62 for movement toward and away from housing 30. Slide 64 is powered for longitudinal travel by a cylinder 66. In the forwardmost position the front end of slide 64 is urged against a stop 68 on slideway 62. A clamp 70 for piston 12 is mounted on slide 64. Clamp 70 comprises a fixed jaw 72 and a movable jaw 74, the jaws being pivotally connected as at 76. The jaws are urged into and out of clamping relation with the outer periphery of piston 12 by means of an adjusting screw 78.

As shown in FIGS. 3, 5 and 7, spindle housing 46 is rotatable within the bore 44 of carrier 34. It is adapted to be clamped in a rotatably adjusted position on the carrier by means of a clamp 80 which overlaps a flange 82 on housing 44 and is secured in place by means of a screw 90. In the position shown in FIGS. 3 and 5 housing 46 is rotated to a position wherein the central axis C of spindle 52 is spaced radially from the central axis A of carrier 34 a maximum distance. In FIG. 7 housing 46 is shown rotated within bore 44 180° from the position shown in FIGS. 3 and 5. Thus, in FIG. 7 the central axis C of spindle 52 is spaced radially from the central axis A of carrier 44 a minimum distance. It therefore follows that, when spindle housing 46 is clamped in the position shown in FIGS. 3 and 5, cutting tool 60 will machine its largest possible diameter in the end face of the piston and, when rotated to the position shown in FIG. 7, the cutting tool will machine its smallest possible diameter. Thus, the sizes of the inner and outer diameters of the counterbore 14 can be varied as desired by simply rotating housing 46 in carrier 34 between the two positions illustrated in FIGS. 5 and 7. It will be understood, of course, that the adjustment shown in FIG. 7 will be employed where the piston itself has a small outer diameter. Such a piston is designated 12a in FIG. 6. In this case the tool holder 54a is designed so that the cutting tool 60 is spaced substantially closer to the axis C of spindle 52 than is the case when machining a larger piston.

It will be appreciated that from the standpoint of efficiency a plurality of tools 60 would be used on the tool holder. Thus, as shown in FIGS. 8 and 9, tool holder 54 has a plurality of four cutting tools 60 mounted thereon.

Referring again to FIG. 3, it will be noted that housing 30 has a pair of switches 92,94 thereon, each switch having a flexible wand 96 thereon projecting radially toward spindle housing 46. Likewise, adjacent the rear end thereof spindle housing 46 has a pair of radially projecting dogs 98,100 adapted to engage the wands 96 when housing 46 rotates about the axis A. The relative positions of the switches and dogs are illustrated only diagrammatically in FIG. 3. They are actually positioned such that, when carrier 34 has rotated slightly more than one revolution about its central axis A, after the rotating tool 60 has been advanced into the face of the piston to the desired depth by cylinder 66, dog 98 will contact the wand 96 of switch 92 and stop the operation of motor 102 that drives worm 40. The cutter 60 has thus orbited around the axis of the piston in a circular path of sufficient extent to machine a completed annular counterbore 14. When the next successive workpiece is machined, motor 102 is automatically operated to rotate carrier 34 in the opposite direction until dog 100 engages the wand 96 of switch 94, the extent of rotation again being at least slightly greater than one revolution. Rotating the carrier 34 first in one direction and then reversing its direction of rotation for the next cycle insures that the electrical wires furnishing power to motor 58 will not become entwined. It will be understood, of course, that motor 58 could be supplied with power through slip-rings 104 as shown in FIG. 10, in which case its reversal of direction for successive workpieces by reversal of motor 102 would not be required.

I claim:

1. A machine for machining the solid outer end face of a piston so as to form in said end face an annular counterbore with an axially outwardly projecting central land at the center thereof comprising, a base, a headstock housing on said base having an axial bore therein, means for mounting a piston to be machined on said base so that the central axis of the piston is aligned with the axis of said bore, a carrier journalled for rotation in said bore, said carrier having an axially extending bore therein which is eccentric relative to the axis of rotation of the carrier, a spindle housing secured in the bore of the carrier to rotate therewith, said spindle housing being rotatably adjustable in said carrier bore, said spindle housing having an axially extending bore therein which is disposed eccentrically relative to the central axis of the spindle housing, a tool spindle journalled for rotation in said spindle housing bore and constructed and arranged to receive a cutting tool thereon adapted to engage said end face of the piston when the piston and tool are displaced axially toward one another, means for moving the piston axially relative to the spindle, a motor carried by said spindle housing for rotation therewith and having an output shaft operably connected to said spindle for rotating the spindle around its own central axis to rotate the cutting tool, and drive means simultaneously rotating the carrier about the axis of the bore of the headstock housing through at least one revolution so as to cause the rotating cutting tool to orbit around the central axis of the housing bore and thereby machine said counterbore.

2. A machine as called for in claim 1 wherein said housing is axially fixed on said base and said piston is mounted on said base for axial movement toward and away from said housing.

3. A machine as called for in claim 1 wherein said motor is an electric motor and which also comprises slip rings for supplying power to said electric motor for rotating the spindle and said drive means is constructed and arranged to rotate said carrier in one direction of rotation for machining successive pistons.

4. A machine as called for in claim 1 wherein the cutting tool is spaced radially from the axis of the spindle such that the circular path of the rotating tool is always disposed radially outwardly of the central axis of the piston and radially inwardly of the outer periphery of the piston.

5. A machine as called for in claim 4 wherein the spindle housing is rotatably adjustable in the bore of the carrier to adjustably displace the orbital path of the tool radially toward and away from the central axis of the piston.

6. A machine for machining the solid outer end face of a piston so as to form in said end face an annular counterbore with an axially outwardly projecting central land at the center thereof comprising, a base, a headstock housing on said base having an axial bore therein, means for mounting a piston to be machined on said base so that the central axis of the piston is aligned with the axis of said bore, a carrier journalled for rotation in said bore, said carrier having an axially extending bore therein which is eccentric relative to the axis of rotation of the carrier, a spindle housing secured in the bore of the carrier to rotate therewith, said spindle housing being rotatably adjustable in said carrier bore, said spindle housing having an axially extending bore therein which is disposed eccentrically relative to the central axis of the spindle housing, a tool spindle journalled for rotation in said spindle housing bore and having a cutting tool thereon adapted to engage said end face of the piston when the piston and tool are displaced axially toward one another, means for moving the piston axially relative to the spindle, means for rotating the spindle around its own central axis and simultaneously rotating the carrier about the axis of the bore of the headstock housing so as to cause the rotating cutting tool to rotate about the axis of the spindle and to orbit around the central axis of the housing bore and thereby machine said counterbore, and said means for rotating the spindle having an electric motor which is fixed relative to said spindle housing, said motor having an output shaft operatively connected with said spindle, and drive means for rotating the carrier first in one direction through at least one revolution and then in the opposite direction through at least one revolution.

7. A machine as called for in claim 6 wherein the cutting tool is spaced radially from the axis of the spindle such that the circular path of the rotating tool is always disposed radially outwardly of the central axis of the piston and radially inwardly of the outer periphery of the piston.

8. A machine as called for in claim 6 wherein the spindle housing is rotatably adjustable in the bore of the carrier to adjustably displace the orbital path of the tool radially toward and away from the central axis of the piston.

9. A machine as called for in claim 6 wherein said last-mentioned drive means for rotating the carrier comprises a motor fixed relative to the headstock housing for rotating the carrier in opposite directions, switch means for controlling the direction of rotation of the last-mentioned motor and switch actuating means mounted on the spindle housing to rotate therewith and positioned to engage said switch means to reverse the direction of rotation of the carrier after each revolution of the carrier.

10. A machine as called for in claim 9 wherein said switch means comprises a pair of switches fixed relative to the headstock housing, said switch actuating means comprising a dog for each switch axially aligned with its respective switch to engage and actuate its respective switch in response to rotation of the carrier through at least one revolution in opposite directions.

11. A machine as called for in claim 10 wherein the switches and the dogs are arranged to rotate the carrier through at least greater than one revolution in each direction.

* * * * *